United States Patent
Roehl et al.

(10) Patent No.: US 12,288,078 B2
(45) Date of Patent: Apr. 29, 2025

(54) SYSTEMS AND METHODS FOR BOOTSTRAP MANAGEMENT

(71) Applicant: Salesforce, Inc., San Francisco, CA (US)

(72) Inventors: Ron Roehl, Chelmsford, MA (US); Jean Elie Bovet, Los Angeles, CA (US); Qingqing Liu, Dublin, CA (US); Christopher Douglas Seymour, Vancouver (CA); Tarun Nainani, Fremont, CA (US); Minzhi Hu, Irvine, CA (US); Vijayan Kothandaraman, Fremont, CA (US); Xiaoguang Yang, Irvine, CA (US)

(73) Assignee: Salesforce, Inc., San Francisco, CA (US)

( * ) Notice: Subject to any disclaimer, the term of this patent is extended or adjusted under 35 U.S.C. 154(b) by 387 days.

(21) Appl. No.: 17/159,581

(22) Filed: Jan. 27, 2021

(65) Prior Publication Data

US 2022/0236998 A1  Jul. 28, 2022

(51) Int. Cl.
*G06F 9/4401* (2018.01)
*G06F 9/445* (2018.01)
(Continued)

(52) U.S. Cl.
CPC .......... *G06F 9/4416* (2013.01); *G06F 9/445* (2013.01); *G06F 9/541* (2013.01); *G06F 12/0875* (2013.01); *G06F 2212/45* (2013.01)

(58) Field of Classification Search
CPC ........ G06F 9/4416; G06F 9/445; G06F 9/541; G06F 12/0875; G06F 2212/45;
(Continued)

(56) References Cited

U.S. PATENT DOCUMENTS

| 2013/0219383 | A1* | 8/2013 | Hilerio | G06F 8/65 |
| | | | | 717/178 |
| 2016/0231881 | A1* | 8/2016 | Sirpal | H04L 41/22 |
| 2018/0063284 | A1* | 3/2018 | Doar | H04L 67/06 |

OTHER PUBLICATIONS

"Disabling Chrome cache for website development" Revision 22 of 25, Oct. 2019 (Year: 2019).*

* cited by examiner

*Primary Examiner* — Kim Huynh
*Assistant Examiner* — Cory A. Latham
(74) *Attorney, Agent, or Firm* — Sterne, Kessler, Goldstein & Fox P.L.L.C.

(57) ABSTRACT

The present disclosure is directed techniques for bootstrap management. A method includes: upon an initial launch of an application on a client device, fetching, from a server and using a native component of the application, content for loading a web component of the application on the client device; determining whether a bootstrap management mode is enabled on the client device; and responsive to the bootstrap management mode is enabled and in response to the web component being launched: receiving, at the native component and from the web component, a manifest and a request for bootstrapping resources; caching, by the native component, the manifest from the web component; fetching, from the server and using the native component, the bootstrapping resources requested by the web component; caching, by the native component, the fetched bootstrapping resources in the memory; and providing, by the native component, the fetched bootstrapping resources to the web component.

20 Claims, 4 Drawing Sheets

(51) Int. Cl.
*G06F 9/54* (2006.01)
*G06F 12/0875* (2016.01)

(58) Field of Classification Search
CPC . G06F 16/9574; G06F 9/44505; H04L 67/02;
H04L 67/133; H04L 67/34
See application file for complete search history.

SYSTEMS AND METHODS FOR BOOTSTRAP MANAGEMENT

BACKGROUND

Mobile applications use application caching that enables a web application to operate offline. For example, a well-known caching technique is known as Application Cache, or AppCache, which enables developers to create offline hybrid applications. The AppCache is a repository of files required by the hybrid application to launch while disconnected from a mobile data connection or wireless connection. The required files are defined by a manifest that contains a list of files needed by the hybrid application. AppCache operates within the confines a browser's user agent and defers all aspects of the implementation and caching mechanics to the user agent in an opaque way that cannot be extended to native components of the application.

Thus, application caching allows users to browse offline, i.e., users can navigate to a website offline, increases speed as cached resources are local on a device, which enables the cache resources to be loaded faster, and reduces loads on servers as client devices request resources when there are changes to the resources, as indicated by the server. However, AppCache is now deprecated, and as such, there is a need to provide a new technique for performing application caching.

BRIEF DESCRIPTION OF THE DRAWINGS/FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

It is to be appreciated that the Detailed Description section, and not the Abstract sections, is intended to be used to interpret the claims. The Summary and Abstract sections may set forth one or more but not all example embodiments as contemplated by the inventor(s), and thus, are not intended to limit the appended claims in any way.

The present disclosure is directed to an ecosystem that provides for techniques for bootstrap management. The techniques for bootstrap management described herein provide for increased control over offline caching behaviors for mobile applications in comparison to AppCache. For example, in contrast to AppCache, the bootstrapping management techniques of the present disclosure provide mobile application developers with full control of the networking and caching operations of the mobile applications and enables the developers to leverage native-side resources, such as, but not limited to, secure, persistent storage and native operating system networking application programming interfaces (APIs). This control provides distinct benefits compared to AppCache, including both maximum storage quota and mitigation of security concerns. For example, some mobile applications may exceed a storage quota of AppCache, with no ability to configure the maximum storage size or work-around in any way. To resolve this, the present disclosure enables developers to set the maximum quota size based on the needs of the mobile application being developed. As another example, AppCache stores cached resources in an unencrypted manner. To resolve this, techniques for bootstrap management of the present disclosure enable developers to encrypt the data when writing to a native file system.

Additionally, having full imperative control provided by the bootstrapping management techniques described herein also provides other benefits including, but not limited to: enhanced logging, enhanced ability to debug, enhanced integration with metrics infrastructure, and enables a direct interface with a mobile platform's native networking APIs, which allows developers to use background cycles to download bootstrap resources.

To achieve the advantages described herein, the present disclosure provides for a bootstrap management technique that establishes a contract between a hybrid application and web content to support bootstrapping of a web component of the hybrid application under any network condition. In some embodiments, the web component may be a single page application ("SPA"), e.g., a web application that dynamically rewrites portions of the web application with new data, rather than loading entirely new pages.

Figure 1:
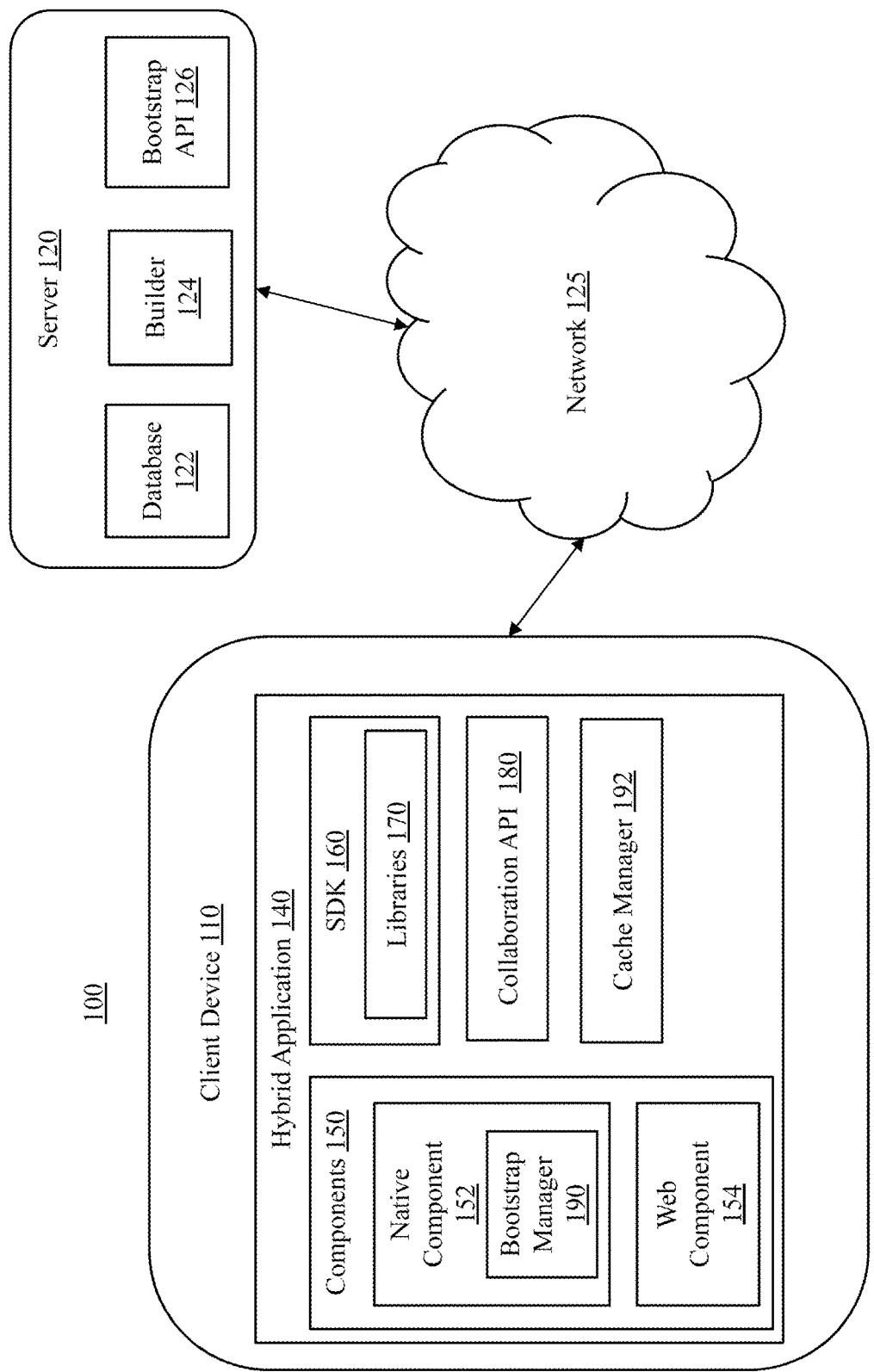
FIG. 1 is a block diagram of a system, according to some example embodiments.

FIG. 1 is a diagram of an example environment 100 in which example systems and/or methods may be implemented. As shown in FIG. 1, environment 100 may include a client device 110, a server 120, and a network 125. Devices of the environment 100 may interconnect via wired connections, wireless connections, or a combination of wired and wireless connections. Devices of environment 100 may include a computer system 400 shown in FIG. 4, discussed in greater detail below. The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

In some embodiments, the client device 110 may be, for example, a mobile phone (e.g., a smart phone, a radiotelephone, etc.), a handheld computer, tablet, a laptop, a gaming device, a wearable communication device (e.g., a smart wristwatch, a pair of smart eyeglasses, etc.), or a similar type of device that is configured to operate an application, such as a hybrid application 140 described herein. In some embodiments, the hybrid application 140 may include a plurality of components 150 including a native component 152 and a web component 154. While FIG. 1 illustrates the hybrid application having a single native component 152 and a single web component 154, it should be understood by those of ordinary skill in the art that the native component 152 and the web component 154 may each be a plurality of native components and a plurality of web component, respectively.

Figure 2:
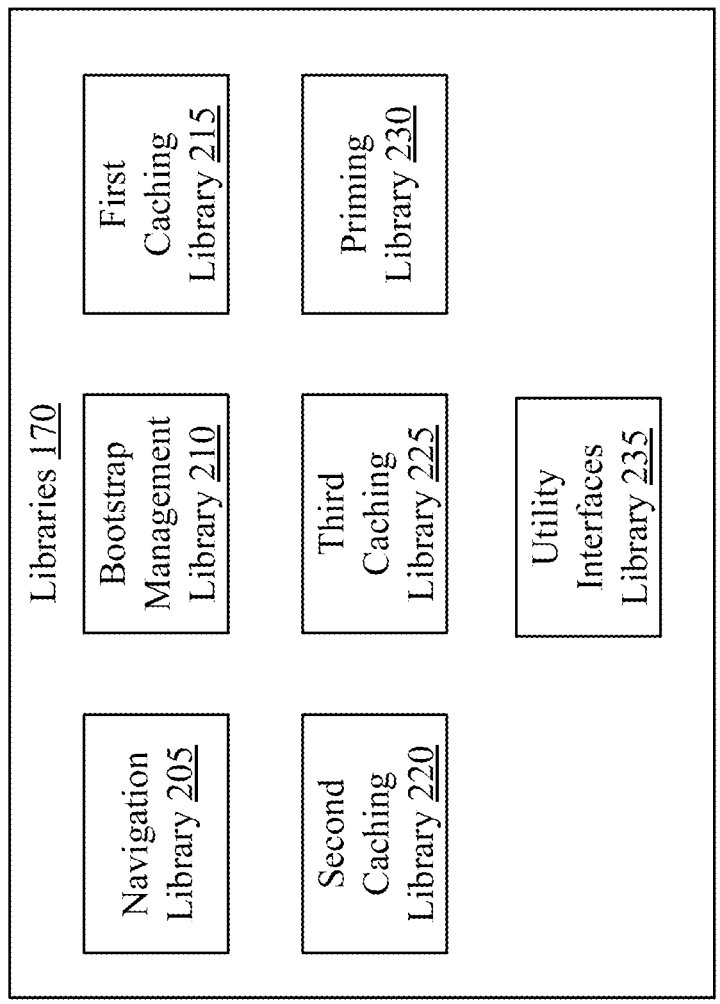
FIG. 2 is a block diagram of a plurality of libraries of a system design kit (SDK), according to some example embodiments.

Additionally, in some embodiments, the hybrid application 140 may include a system design kit (SDK) 160. The SDK 160 may include a plurality of libraries 170. For example, as shown in FIG. 2, the plurality of libraries 170 include a include navigation library 205 that provides for web view management and navigation handling, a bootstrap management library 210 that provides for the retrieval and caching of host pages and bootstrap management, a first caching library 215 that provides for data caching with native requests and storage, a second caching library 220 that provides for component definition retrieval and caching, a third caching library 225 that provides for caching and injection of resources, a priming library 230 that provides for the ability to prime specific modules, and a utility interfaces library 235 that provides for utility interfaces and allows for plugging in different network and storage implementations. It should be understood by those of ordinary skill in the arts that these are merely some examples of libraries and that other libraries are further contemplated in accordance with aspects of the present disclosure.

The network 125 may include one or more wired and/or wireless networks. For example, the network 125 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The server 120 may include a server device (e.g., a host server, a web server, an application server, etc.), a data center device, or a similar device, capable of communicating with the client device 110 via the network 125. In some embodiments, the server 120 may include a database 122 that stores an application framework that is used to build the web component 154 of the hybrid application 140. For example, the application framework may be a Hypertext Markup Language (HTML) application framework. In some embodiments, the application framework may be operating system agnostic, i.e., the application framework may be used with any operating system of the client device 110.

In some embodiments, the application framework may identify aspects of the web component 154 that require rendering of HTML content. For example, the web component 154 may have state information, e.g., a data structure containing information describing the web component 154 at any given point in time, and the application framework may identify any HTML-level assets that are required to bootstrap the web component 154.

In some embodiments, the server 120 may also include a builder 124 to build content for loading the web component 154, i.e., a root-level HTML page. For example, the root-level HTML page may represent an HTML structure that is rendered into an HTML page at run-time of the web component 154. In some embodiments, the builder 124 may inject placeholders for rendering HTML components and/or JavaScript components into the application framework to build the root-level HTML page. In some embodiments, the HTML components and/or JavaScript components may identify bootstrap resources required by the web component 154. For example, the bootstrap resources may include, but are not limited to, a host page, JavaScript (JS) files, cascading style sheet (CSS) files, cache busters, or the like. Thus, in some embodiments, the root-level HTML page may include placeholders for rendering the HTML components and/or JavaScript components at run-time of the web component 154 based on one or more specifications of the hybrid application 140, e.g., a type of HTML and/or JavaScript rendering implemented by the hybrid application 140. In some embodiments, the root-level HTML page generated by the builder 124 may be transmitted to the client device 110.

In some embodiments, the server 120 may also include a bootstrap API 126 that includes an endpoint that provides the respective bootstrapping resources for each of the web component 154. In some embodiments, as discussed below, the server 120 may receive, at the bootstrap API 126, a request from the native component 152 for the bootstrapping resources for the web component 154, and the server 120 may transmit the requested bootstrapping resources to the native component 152. Thus, in some embodiments, content of a payload of the bootstrap API 126 may be customized for different web components 154.

In some embodiments, the client device 110 may execute a bootstrap management process for an initial launch of the hybrid application 140, referred to as a cold cache. That is, the cold cache occurs when the application cache is empty. In the cold cache, upon an initial launch of the hybrid application 140, the native component 152 may fetch, from the server 120, content for loading the web component 154. For example, the content for loading the web component 154 may include the root-level HTML page for the web component 154. In some embodiments, the native component 152 may fetch the content for loading the web component 154 using a bootstrap manager 190, i.e., a native-layer communications client.

In some embodiments, during the cold cache, the hybrid application 140 may preclude the web component 154 from performing any network communications with the server 120. Thus, in some embodiments, the content for loading the web component 154 may be fetched natively using the native component 152, rather than the web component 154. In this way, the bootstrap management technique of the present disclosure migrates responsibility of the fetching the content for loading the web component 154 from the web component 154 to the native component 152.

In some embodiments, when the content for loading the web component 154 is received, the native component 152 may inject the content into the web component 154 and initiate HTML page rendering. In some embodiments, fetching the content for loading the web component 154 may be performed at any time prior to injecting the content into the web component 154. For example, the content may be fetched during off-peak hours, e.g., overnight, during reduced usage of the client device 110, during background cycles, or the like, such that fetching the content does not interfere with operations of the hybrid application 140 and/or the client device 110.

In some embodiments, using the bootstrap manager 190, the hybrid application 140 may also determine whether a bootstrap management mode is enabled. In some embodiments, a default mode of the bootstrap management mode may be enabled. In some embodiments, when the bootstrap management mode is enabled, the hybrid application 140 may execute the bootstrap management processes described herein. In contrast, in some embodiments, when the bootstrap management mode is disabled, the web component 154 may obtain bootstrapping resources over the network 125 using any prior bootstrapping process.

In some embodiments, the native component 152 may cache a status of the bootstrap management mode in, for example, the SDK 160, e.g., in the bootstrap management library 210. In some embodiments, the SDK 160 may provide a persistent, encrypted storage for caching information.

In some embodiments, in response to the bootstrap management mode being enabled and the web component 154 being launched, the native component 152 may receive a manifest and a request for bootstrapping resources from the web component 154. In some embodiments, the manifest may define application metadata of the web component 154. For example, in some embodiments, the manifest may be a JavaScript Object Notation (JSON) file that instructs the hybrid application 140 how the web component 154 operates and behaves when installed on the hybrid application 140.

In some embodiments, as some examples, the metadata may define a name of the web component 154, information about one or more icons used by the web component 154, a uniform resource locator (URL) that should be opened when the web component 154 is launched, as well as other properties about the web component 154, such as, a color scheme of the web component 154 and a display layout of the given component 154. It should be understood by those of ordinary skill in the art that these are merely examples of the types of metadata defined by the manifest, and that other types of metadata are further contemplated in accordance with aspects of the disclosure. Additionally, the requested bootstrapping resources may be defined in the root-level HTML page generated by the builder 124.

In response to receiving the manifest, the native component 152 may cache the manifest in, for example, in the bootstrap management library 210. Additionally, as the root-level HTML page loads, the hybrid application 140 may execute inline script, e.g., script that may be executed without the need to include a separate file, operating on the hybrid application 140 in order to process the list of requested bootstrap resources from the web component 154 and request each resource from the server 120. For example, in some embodiments, the native component 152 may fetch, from the server 120, the bootstrapping resources requested by the web component 154. This may be achieved by issuing a call to the bootstrap API 126 of the server 120. In response, the bootstrap API 126 may transmit the requested bootstrapping resources to the native component 152. Thus, the hybrid application 140 may perform all network fetches using the native component 152.

In some embodiments, in response to fetching the bootstrapping resources from the bootstrap API 126, the native component 152 may cache the fetched bootstrapping resources in, for example, the bootstrap management library 210. Additionally, in some embodiments, the native component 152 may provide the fetched bootstrapping resources to the web component 154, and in response to receiving the fetched bootstrapping resource, the web component 154 may complete initialization. Thus, in some embodiments, the fetched bootstrapping resources may be provided to the web component 154, such that the required bootstrap resources are retrieved exclusively by the native component and provided to the web component 154 without the web component 154 performing any direct network communications with the server 120.

In some embodiments, communications between the native component 152 and the web component 154 may be executed using a collaboration API 180. For example, the collaboration API 180 may be a JavaScript collaboration tool. In some embodiments, the collaboration API 180 may enable the web component 154 to send the request for the bootstrapping resources to the native component 152. Additionally, in some embodiments, the native component 152 may communicate the fetched bootstrapping resources to the web component 154 using the collaboration API 180.

In some embodiments, for a second launch of the hybrid application 140 subsequent to the initial launch, referred to as a warm cache, the native component 152 may provide the fetched and cached bootstrapping resources to the web component 154 and, in parallel, request, from the server 120, any updates to the cached bootstrapping resources. That is, the native component 152 may recognize that the bootstrapping resources were previously cached, and may load such bootstrapping resources from the cache accordingly. Additionally, in some embodiments, in response to receiving updated bootstrapping resources, the native component 152 may compare the new bootstrapping resources to the cached bootstrapping resources.

In response to receiving the new bootstrapping resources and the cached bootstrapping resources being the same, the native component 152 may instruct the web component 154 to continue to utilize the cached bootstrapping resources from the bootstrap management library 210.

In some embodiments, in response to the new bootstrapping resources and the cached bootstrapping resources being different, the native component 152 may purge the cached bootstrapping resources and update the cache accordingly. Additionally, the native component 152 may provide any changes to the bootstrapping resources to the web component 154. In some embodiments, purging the cached bootstrapping resources may include selectively purging a portion of the cached bootstrapping resources (rather than busting the entire cache). For example, selectively purging a portion of the cached bootstrapping resources may include purging outdated bootstrapping resources, as indicated by the new bootstrapping resources. Thus, the techniques described herein provide for control over offline caching behaviors In some embodiments, the new bootstrapping resources may be provided as an entity tag (ETag) or a data payload, as should be understood by those of ordinary skill in the art. In some embodiments, simultaneously fetching the new bootstrapping resources from the server 120 may be omitted when the client device 110 is disconnected from the network 125.

In some embodiments, the cached bootstrapping resources and/or the manifest from the web component 154 may be unique for each user of the hybrid application 140. That is, when two or more users use the same hybrid application 140, the hybrid application 140 may maintain a distinct version of the cache for each user. In some embodiments, the hybrid application 140 may include a maximum number of users that can use the hybrid application 140 to avoid consuming excessive amounts of memory.

In some embodiments, as the bootstrapping resources are cached natively, i.e., using the native component 152, the hybrid application 140 may include a cache manager 192. The cache manager 192 may be responsible for managing the manifest of the web component 154, updating the cache, purging the cache, including purging the cache responsive to a number of users exceeding the maximum number of users, or the like.

Figure 3:
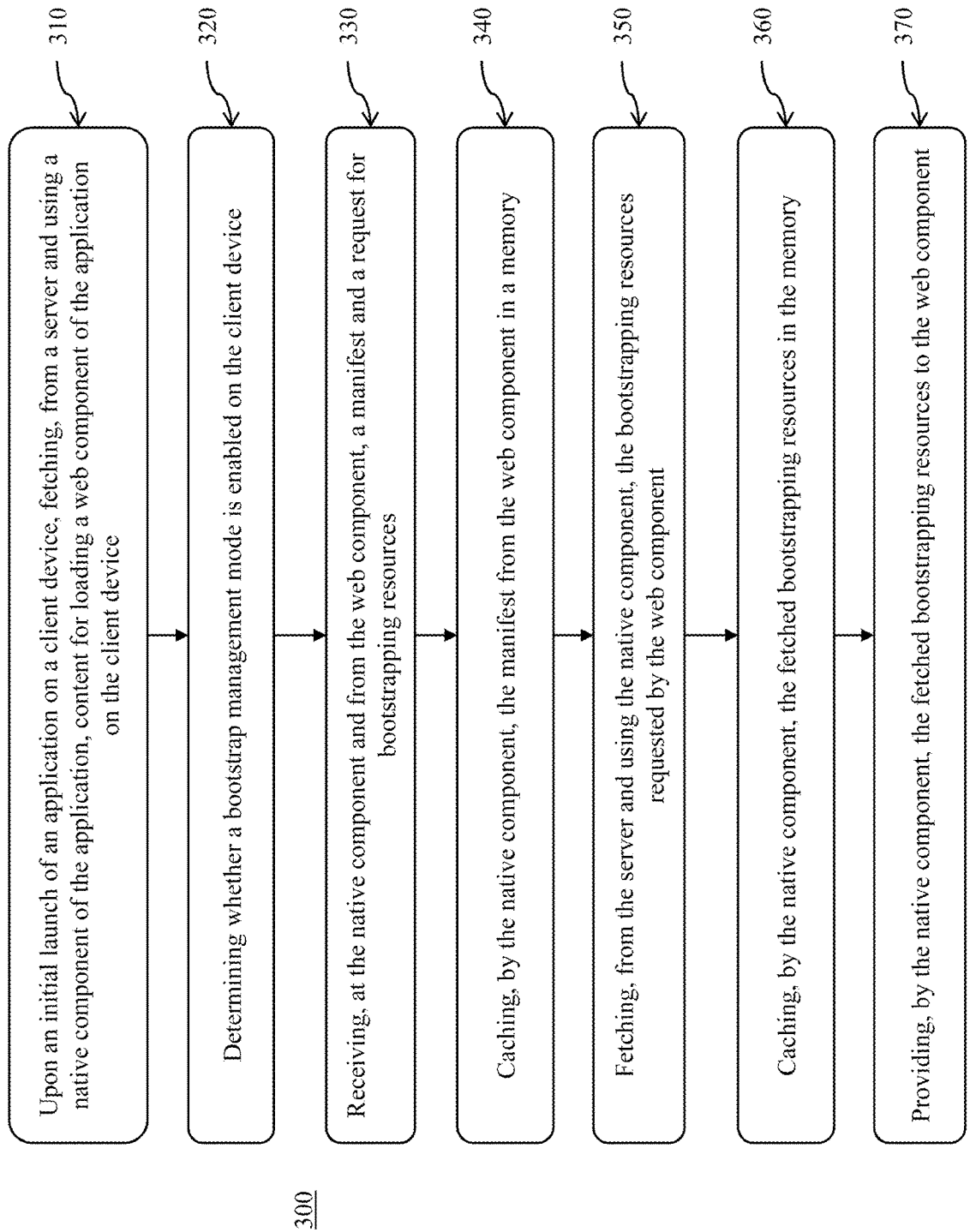
FIG. 3 is a flowchart illustrating a process for integrating mobile application plugins, according to some example embodiments.

FIG. 3 is a flow chart of an example method 300 for bootstrapping a web component. In some embodiments, one or more processes described with respect to FIG. 3 may be performed by the client device 110 of FIG. 1.

At 310, the method 300 may include, upon an initial launch of an application (e.g., hybrid application 140 of FIG. 1) on a client device (e.g., client device 110 of FIG. 1), fetching, from a server (e.g., server 120 of FIG. 1) and using a native component of the application (e.g., native component 152 of FIG. 1), content for loading a web component (e.g., web component 154 of FIG. 1) of the application on the client device.

At 320, the method 300 may include determining whether a bootstrap management mode is enabled on the client device 110. For example, the native component 152 may determine a status of the bootstrap management mode, i.e., enabled versus disabled.

In response to the bootstrap management mode being enabled and the web component 154 being launched, the method 300 may include steps 330-370. For example, at 330, the method 300 may include receiving, at the native component 152 and from the web component 154, a manifest and a request for bootstrapping resources. In some embodiments, the manifest may define application metadata of the web component 154. For example, in some embodiments, the manifest may be a JavaScript Object Notation (JSON) file that instructs the mobile application how the given component 154 operates and how behaves when installed on the hybrid application 140. In some embodiments, the web component 154 may communicate the manifest and requested bootstrapping resources to the native component 152 using an API, e.g., the collaboration API 180 of FIG. 1.

At 340, the method 300 may include caching, by the native component 152, the manifest from the web component 154 in a memory. In some embodiments, the native component 152 may cache the manifest in, for example, the SDK 160 of FIG. 1, e.g., in the bootstrap management library 210 of FIG. 2.

At 350, the method 300 may include fetching, from the server 120 and using the native component 152, the bootstrapping resources requested by the web component 154. In some embodiments, the native component 152 may issue a call to an API of the server 120, e.g., bootstrap API 126 of FIG. 1. In response, the bootstrap API 126 may transmit the requested bootstrapping resources to the native component 152.

At 360, the method 300 may include caching, by the native component 152, the fetched bootstrapping resources in the memory. In some embodiments, the native component 152 may cache the fetched bootstrapping resources in, for example, in the bootstrap management library 210.

At 370, the method 300 may include providing, by the native component 152, the fetched bootstrapping resources to the web component 154. For example, in some embodiments, the native component 152 may communicate the fetched bootstrapping resources to the web component 154 using the collaboration API 180.

Figure 4:
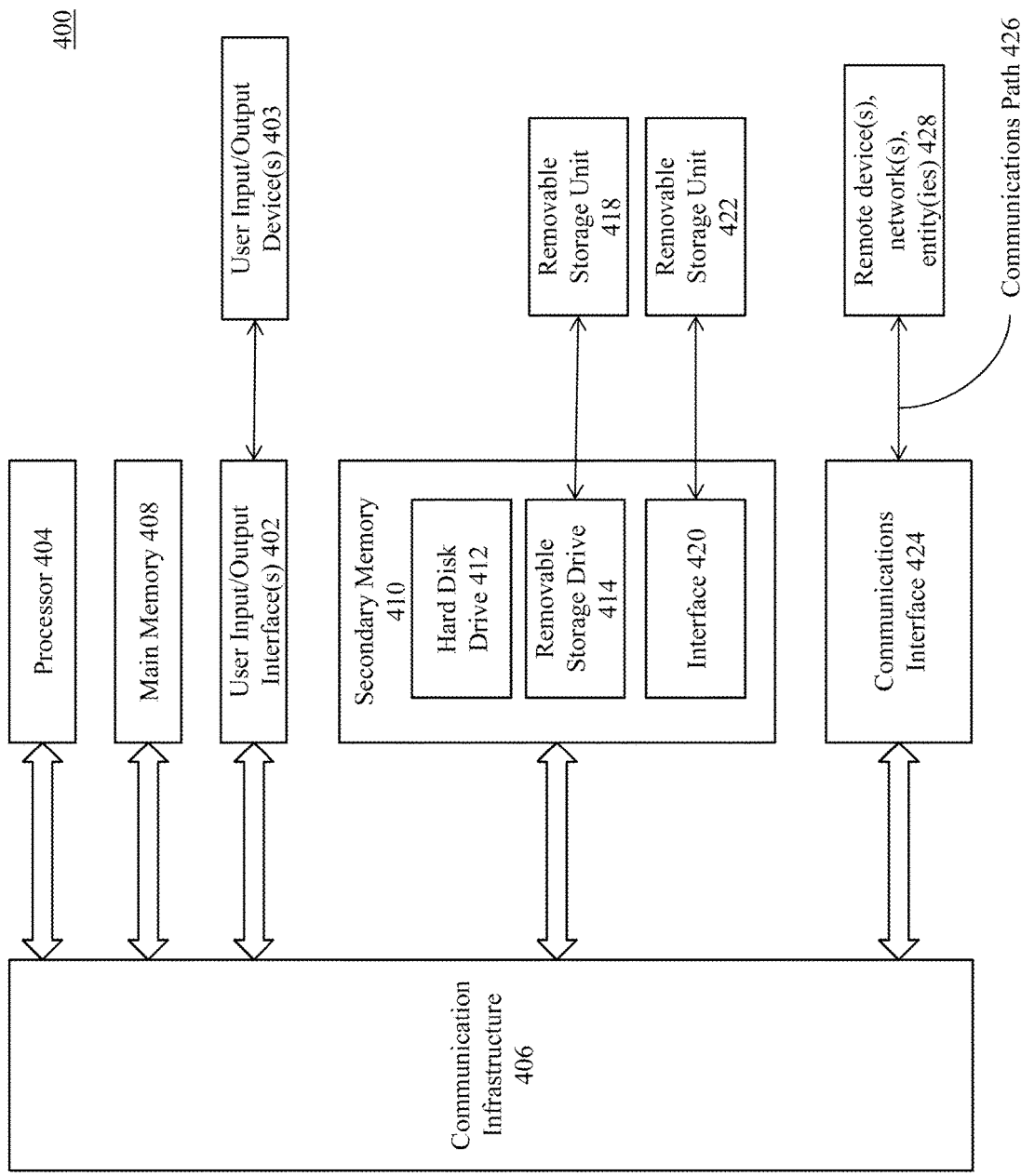
FIG. 4 is an example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system embodiments other than those described herein.

While this disclosure describes example embodiments for example fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

The foregoing description of the example embodiments will so fully reveal the general nature of the invention that others can, by applying knowledge within the skill of the art, readily modify and/or adapt for various applications such specific embodiments, without undue experimentation, without departing from the general concept of the disclosure. Therefore, such adaptations and modifications are intended to be within the meaning and range of equivalents based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described example embodiments, but should be defined only in accordance with the following claims and their equivalents.

What is claimed is:

1. A computer-implemented method, comprising:
upon an initial launch on a client device of a web component of a hybrid mobile application including the web component and a native component, requesting from a server by the native component, root HyperText Markup Language (HTML) for loading a webpage in the web component of the hybrid mobile application on the client device;
injecting, by the native component, the root HTML received from the server into the web component, wherein the root HTML includes a list of bootstrapping resources for rendering the webpage;
receiving, at the native component and from the web component, a manifest and a request for the bootstrapping resources for rendering the webpage;
caching, by the native component, the manifest from the web component in a memory;
fetching, from the server by the native component, the bootstrapping resources requested by the web component;
caching, by the native component, the fetched bootstrapping resources in the memory;
providing, by the native component, the fetched bootstrapping resources to the web component; and
rendering the webpage within the hybrid mobile application based on the fetched bootstrapping resources,
wherein the web component is precluded from communicating with the server.

2. The method of claim 1, wherein the fetching the bootstrapping resources comprises fetching the bootstrapping resources from an application programming interface (API) operating on the server.

3. The method of claim 1, wherein a bootstrap management mode is enabled on the client device and the method further comprises caching a status of the bootstrap management mode.

4. The method of claim 3, wherein, for a second launch of the hybrid mobile application subsequent to the initial launch, the method further comprises simultaneously providing the fetched bootstrapping resources from the memory to the web component and requesting, by the native component and from the server, updates to the cached bootstrapping resources.

5. The method of claim 4, further comprising selectively purging, based on the updated bootstrapping resources, an outdated bootstrapping resource from among the cached bootstrapping resources.

6. The method of claim 3, wherein a default mode of the bootstrap management mode is enabled.

7. The method of claim 3, further comprising, responsive to the bootstrap management mode being disabled, obtaining, by the web component, bootstrapping resources over a communications network.

8. A client device, comprising:
a memory; and
a processor coupled to the memory and configured to:
upon an initial launch on a client device of a web component of a hybrid mobile application including a web component and a native component, request from a server by the native component, root HyperText Markup Language (HTML) for loading a webpage in the web component of the hybrid mobile application on the client device;

inject, by the native component, the root HTML received from the server into the web component, wherein the root HTML includes a list of bootstrapping resources for rendering the webpage;

receive, at the native component and from the web component, a manifest and a request for the bootstrapping resources for rendering the webpage;

cache, by the native component, the manifest from the web component in the memory;

fetch, from the server by the native component, the bootstrapping resources requested by the web component;

cache, by the native component, the fetched bootstrapping resources in the memory;

provide, by the native component, the fetched bootstrapping resources to the web component; and render the webpage within the hybrid mobile application based on the fetched bootstrapping resources, wherein the web component is precluded from communicating with the server.

9. The client device of claim 8, wherein, to fetch the bootstrapping resources, the processor is further configured to fetch the bootstrapping resources from an application programming interface (API) operating on the server.

10. The client device of claim 8, wherein a bootstrap management mode is enabled on the client device and wherein the processor is further configured to cache, in the memory, a status of the bootstrap management mode.

11. The client device of claim 10, wherein, for a second launch of the hybrid mobile application subsequent to the initial launch, the processor is further configured to simultaneously provide the fetched bootstrapping resources from the memory to the web component and request, by the native component and from the server, updates to the cached bootstrapping resources.

12. The client device of claim 11, wherein the processor is further configured to selectively purge, based on the updated bootstrapping resources, an outdated bootstrapping resource from among the cached bootstrapping resources.

13. The client device of claim 10, wherein a default mode of the bootstrap management mode is enabled.

14. The client device of claim 10, wherein, responsive to the bootstrap management mode being disabled, the processor is further configured to obtain, using the web component, bootstrapping resources over a communications network.

15. A non-transitory computer-readable device having instructions stored thereon that, when executed by at least one computing device, cause the at least one computing device to perform operations comprising:

upon an initial launch on a client device of a web component of a hybrid mobile application including a web component and a native component, requesting from a server by the native component, root Hyper Text Markup Language (HTML) for loading a webpage in the web component of the hybrid mobile application on the client device;

injecting, by the native component, the root HTML received from the server into the web component, wherein the root HTML includes a list of bootstrapping resources for rendering the webpage;

receiving, at the native component and from the web component, a manifest and a request for the bootstrapping resources for rendering the webpage;

caching, by the native component, the manifest from the web component in a memory;

fetching, from the server by the native component, the bootstrapping resources requested by the web component;

caching, by the native component, the fetched bootstrapping resources in the memory;

providing, by the native component, the fetched bootstrapping resources to the web component; and rendering the webpage within the hybrid mobile application based on the fetched bootstrapping resources, wherein the web component is precluded from communicating with the server.

16. The non-transitory computer-readable device of claim 15, wherein the fetching the bootstrapping resources comprises fetching the bootstrapping resources from an application programming interface (API) operating on the server.

17. The non-transitory computer-readable device of claim 15, wherein a bootstrap management mode is enabled on the client device and the operations further comprise caching a status of the bootstrap management mode.

18. The non-transitory computer-readable device of claim 17 wherein, for a second launch of the hybrid mobile application subsequent to the initial launch, the operations further comprise simultaneously providing the fetched bootstrapping resources from the memory to the web component and requesting, by the native component and from the server, updates to the cached bootstrapping resources.

19. The non-transitory computer-readable device of claim 18, wherein the operations further comprise selectively purging, based on the updated bootstrapping resources, an outdated bootstrapping resource from among the cached bootstrapping resources.

20. The non-transitory computer-readable device of claim 17, wherein the operations further comprise, responsive to the bootstrap management mode being disabled, obtaining, by the web component, bootstrapping resources over a communications network.

\* \* \* \* \*